(12) United States Patent
Mershain et al.

(10) Patent No.: US 8,943,114 B2
(45) Date of Patent: Jan. 27, 2015

(54) METHOD FOR IMPLEMENTING 32 BIT COMPLEX MULTIPLICATION BY USING 16-BIT COMPLEX MULTIPLIERS

(75) Inventors: Eran Ovadia Mershain, Kiryat Yam (IL); Eran Goldstein, Kiryat-Ata (IL)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 735 days.

(21) Appl. No.: 13/211,480

(22) Filed: Aug. 17, 2011

(65) Prior Publication Data

US 2013/0046804 A1    Feb. 21, 2013

(51) Int. Cl.
| G06F 7/00 | (2006.01) |
| G06F 7/48 | (2006.01) |
| G06F 7/53 | (2006.01) |

(52) U.S. Cl.
CPC ............ G06F 7/4812 (2013.01); G06F 7/5324 (2013.01)
USPC ............................ 708/204; 708/200; 708/503

(58) Field of Classification Search
None
See application file for complete search history.

(56) References Cited

U.S. PATENT DOCUMENTS

| 4,181,968 | A | 1/1980 | Johnson | 364/728 |
| 6,411,979 | B1 | 6/2002 | Greenberger | 708/622 |
| 6,823,353 | B2 | 11/2004 | Fischer et al. | 708/622 |
| 6,826,587 | B1* | 11/2004 | Montalvo et al. | 708/622 |
| 7,113,970 | B2 | 9/2006 | Chiueh et al. | 708/622 |
| 7,509,486 | B1 | 3/2009 | Chin et al. | 713/151 |
| RE40,803 | E | 6/2009 | Montalvo et al. | 708/622 |
| 2001/0032228 | A1 | 10/2001 | Fischer et al. | 708/622 |
| 2002/0161813 | A1 | 10/2002 | Chiueh et al. | 708/622 |
| 2003/0009502 | A1 | 1/2003 | Katayanagi | 708/622 |
| 2003/0014458 | A1 | 1/2003 | Fischer et al. | 708/622 |
| 2003/0041083 | A1 | 2/2003 | Jennings, III et al. | 708/622 |
| 2003/0050949 | A1 | 3/2003 | Van Wechel et al. | 708/622 |
| 2003/0088601 | A1 | 5/2003 | Pitsianis et al. | 708/622 |
| 2003/0135532 | A1 | 7/2003 | Peting | 708/622 |
| 2008/0159451 | A1* | 7/2008 | Majonen | 375/346 |

* cited by examiner

*Primary Examiner* — Michael D Yaary
(74) *Attorney, Agent, or Firm* — Christopher P. Maiorana, PC

(57) ABSTRACT

An apparatus including a first circuit and a second circuit. The first circuit may be configured to receive a first 2N-bit complex number and a second 2N-bit complex number, each having a first format, and to reformat the first and the second 2N-bit complex numbers to a second format such that a lower portion of each real and imaginary part of each 2N-bit complex number is positive. The second circuit may be configured to multiply the first and the second 2N-bit complex numbers using at least one N-bit signed complex multiplier, where N is an integer.

20 Claims, 7 Drawing Sheets

METHOD FOR IMPLEMENTING 32 BIT COMPLEX MULTIPLICATION BY USING 16-BIT COMPLEX MULTIPLIERS

FIELD OF THE INVENTION

The present invention relates to digital signal processing generally and, more particularly, to a method and/or apparatus for implementing 32-bit complex multiplication using 16-bit signed complex multipliers.

BACKGROUND OF THE INVENTION

Multiplication of two 32-bit numbers is commonly used in digital signal processing (DSP), usually when a large dynamic range is needed. A regular 32-bit multiplication can be implemented using four 16-bit multipliers; however, the 16-bit multipliers should be capable of accepting both signed and unsigned inputs. Complex number multiplication is an increasingly common operation in digital signal processors (DSPs). A complex number is represented as X+iY, where X represents the real part, Y represents the imaginary part, and i represents the square root of −1. A 32-bit complex number has 32 bits representing the real part X and another 32 bits representing the imaginary part Y. To multiply two complex numbers, $X_1+iY_1$ and $X_2+iY_2$, the computation is typically broken up into four multiplications as illustrated in the following Equation 1:

$$(X_1+iY_1)(X_2+iY_2)=(X_1X_2-Y_1Y_2)+i(X_1Y_2+Y_1X_2). \quad \text{EQ. 1}$$

In a conventional DSP that has a single fixed point multiplier available, the four multiplications can be performed sequentially and the sums and differences formed. For a typical programmable DSP, an addition or subtraction can be performed in parallel with the multiplication, with each of the multiplications or additions taking a cycle. In conventional programmable DSPs that contain two or more multipliers operating in parallel, the multipliers are typically general purpose devices, and each multiplier is a replica of the other. In the conventional multi-multiplier DSP, the complex multiplication takes less time because more than one multiplication can be performed in parallel. For example, in a DSP with four parallel multipliers, the four cross-products (i.e., $X_1X_2$, $Y_1Y_2$, $X_1Y_2$, $Y_1X_2$) can be calculated in parallel.

Conventional methods make use of both regular signed and unsigned 16-bit multipliers to perform a 32-bit complex multiplication. The disadvantage of the conventional methods is that sixteen operations (instructions) are needed to perform one 32-bit multiplication. Some conventional DSPs have signed versions of 16-bit complex multipliers, but no unsigned versions of the 16-bit complex multipliers. In DSPs without an unsigned version of the 16-bit complex multipliers, no regular use can be made of the complex multipliers.

It would be desirable to have a method of implementing 32-bit complex multiplication using only 16-bit signed complex multipliers.

SUMMARY OF THE INVENTION

The present invention concerns an apparatus including a first circuit and a second circuit. The first circuit may be configured to receive a first 2N-bit complex number and a second 2N-bit complex number, each having a first format, and to reformat the first and the second 2N-bit complex numbers to a second format such that a lower portion of each real and imaginary part of each 2N-bit complex number is positive. The second circuit may be configured to multiply the first and the second 2N-bit complex numbers using at least one N-bit signed complex multiplier, where N is an integer.

The objects, features and advantages of the present invention include providing a method and/or apparatus for implementing 32-bit complex multiplication using 16-bit signed complex multipliers that may (i) use four times fewer 16-bit multiplications than conventional techniques, (ii) be performed without dedicated hardware, and/or (iii) provide for a simpler hardware implementation.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
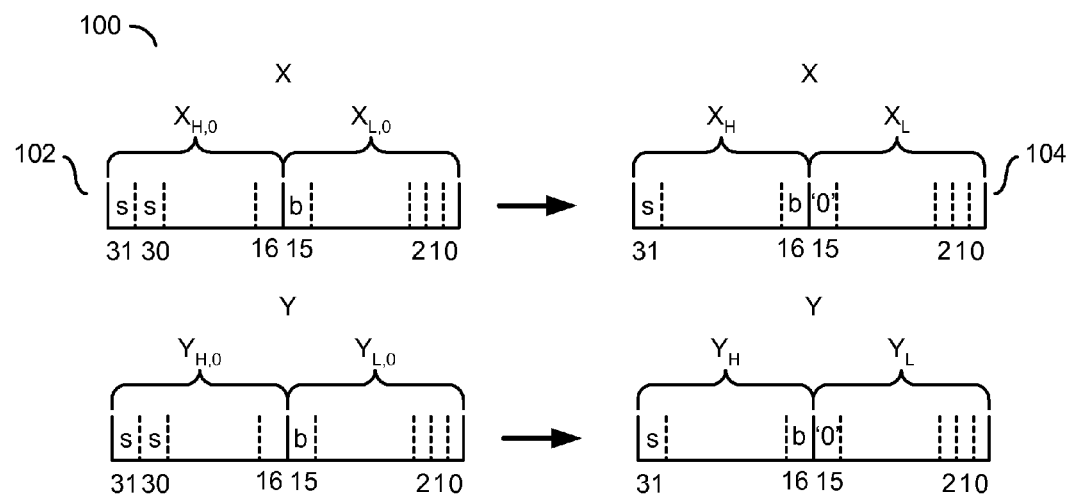
FIG. 1 is a diagram illustrating a process for converting a conventional number representation format into a number representation format in accordance with an example embodiment of the present invention.

Referring to FIG. 1, a diagram is shown illustrating a process 100 for converting a conventional number representation format 102 into a number representation format 104 in accordance with an example embodiment of the present invention. In one example, a pair of 32-bit numbers (e.g., X and Y) may be converted from the convention format 102 to the new format 104 so that the 32-bit numbers X and Y may be multiplied using only 16-bit signed multipiers. Although the example is illustrated utilizing 32-bit numbers, it will be apparent to a person of ordinary skill in the art that the technique in accordance with the present invention may be implemented accordingly for 2N-bit numbers and N-bit multipliers implementing other bit widths.

The conventional number format for each of the 32-bit numbers X and Y may be divided into an original high portion (e.g., $X_{H,0}$ and $Y_{H,0}$, respectively) and an original low portion (e.g., $X_{L,0}$ and $Y_{L,0}$, respectively). Conversion of the conventional format 102 to the new format 104 generally comprises shifting the original high portion (e.g., $X_{H,0}$ or $Y_{H,0}$) along with the most significant bit (MSB) of the corresponding original low portion (e.g., bit 15 of $X_{L,0}$ or $Y_{L,0}$), 1 bit to the left to obtain a new high portion (e.g., $X_L$ or $Y_L$) in the new representation. With respect to the 32-bit example, the new high portions may be expressed by the following equations:

$$X_H = (X_{H,0} \times 2) + \text{bit 15 of } X_{L,0},\qquad\text{EQ. 2}$$

$$Y_H = (Y_{H,0} \times 2) + \text{bit 15 of } Y_{L,0}.\qquad\text{EQ. 3}$$

The respective new format low portions (e.g., $X_L$ and $Y_L$) are generally made positive by replacing bit 15, which was made vacant by the shift, with zero. Because the MSB of the low portions is replaced with zero, the new representation always creates a positive low portion, which allows signed multipliers to be correctly used in the implementation. The high portions in the new representation are twice the magnitude of the high portions for the convention representation. The process 100 generally works in a bit exact manner on up to (2N−1)-bit numbers, where N represents the number of bits in the basic multiplier utilized, and in an approximated manner on 2N-bit numbers.

The process 100 generally works in a bit exact manner on up to (2N−1)-bit numbers, where N represents the number of bits in the basic multiplier utilized, and in an approximated manner on 2N-bit numbers. For example, in the conventional 32-bit representation there are generally only 30 bits of information not including the sign. In particular, the conventional 32-bit representation contains two consecutive sign ('S') bits before the reformatting operation and only one sign bit remains after the reformatting operation. Thus, the method in accordance with the present invention provides a bit exact result for signed numbers of 31 bits, and an approximate result for signed numbers of 32 bits. However, the process 100 may also be used for signed 32-bit numbers by first shifting the numbers one position to the right, thus reducing the numbers to 31 bits.

In one example, a pair of 32-bit numbers (e.g., X and Y) may be converted from the convention format 102 to the new format 104 so that the 32-bit numbers X and Y may be multiplied using only 16-bit signed multipliers. Although the example is illustrated utilizing 32-bit numbers, it will be apparent to a person of ordinary skill in the art that the technique in accordance with the present invention may be implemented accordingly for numbers and multipliers implementing other bit widths.

Figure 2:
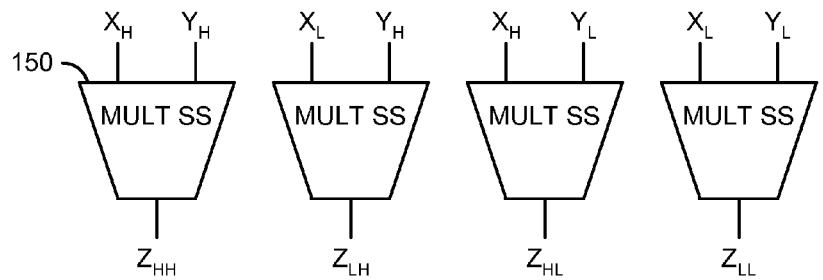
FIG. 2 is a diagram illustrating four multiplications performed to generate cross-products in accordance with an example embodiment of the present invention.

Referring to FIG. 2, a diagram is shown illustrating four multiplications performed using one or more 16-bit signed multipliers to generate cross-products that may be used to generate the product of the two 32-bit numbers X and Y in accordance with an example embodiment of the present invention. In one example, one or more signed multipliers 150 may be used to generate four cross-products (e.g., $Z_{HH} = X_{1H} X_{2H}$, $Z_{LL} = Y_{1L} Y_{2L}$, $Z_{LH} = X_{1L} Y_{2H}$, $Z_{HL} = Y_{1H} X_{2H}$) in the multiplication of two numbers X and Y. In one example, the one or more signed multipliers 150 may be implemented as 16-bit signed multipliers, which may be used to multiply two 32-bit numbers. When the high and low portions for the two numbers have been constructed using the new representation format 104, the cross-products $Z_{HH} = X_{1H} X_{2H}$, $Z_{LL} = Y_{1L} Y_{2L}$, $Z_{LH} = X_{1L} Y_{2H}$, and $Z_{HL} = X_{1H} X_{2H}$ may be generated using the signed multipliers 150. Depending on the features of the particular DSP, the cross-products may be generated sequentially or in parallel (simultaneously). As used herein, the term "simultaneously" is meant to describe events that share some common time period but the term is not meant to be limited to events that begin at the same point in time, end at the same point in time, or have the same duration.

Figure 3:
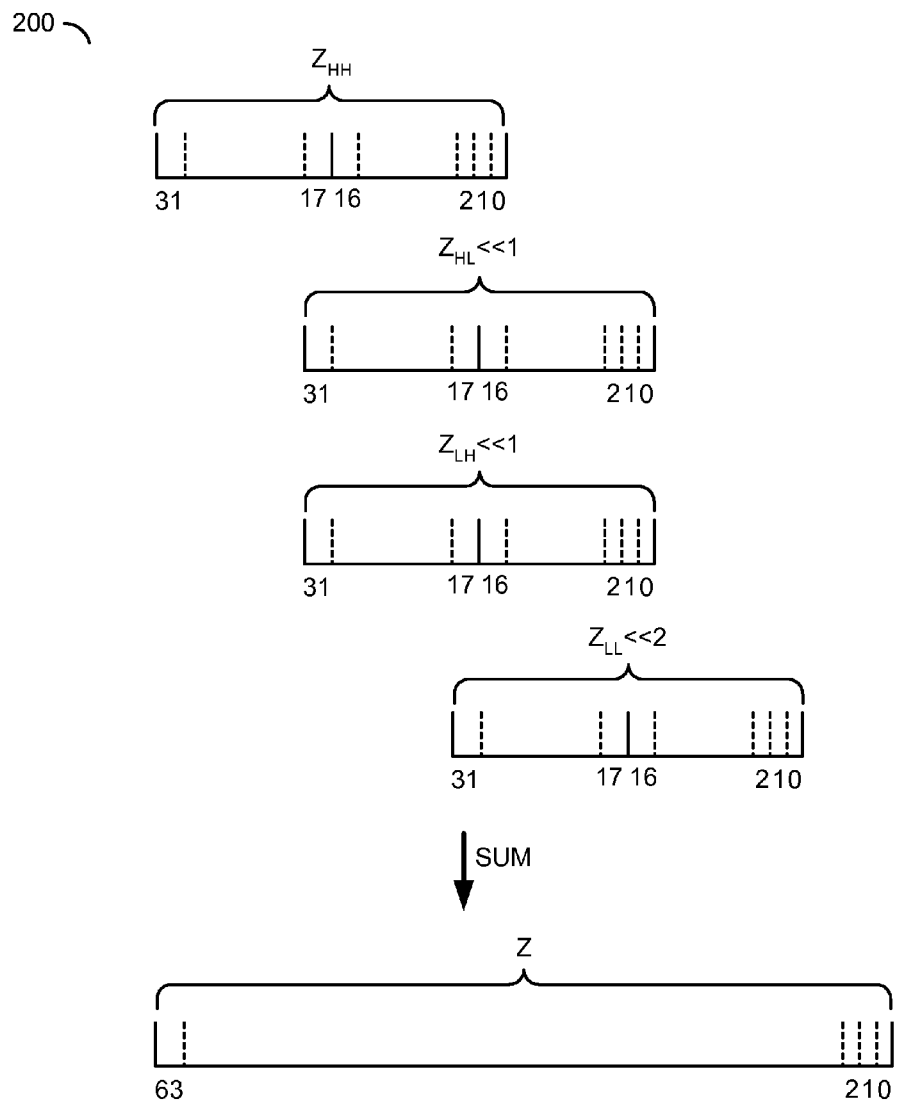
FIG. 3 is a diagram illustrating a recombination operation in accordance with an example embodiment of the present invention.

Referring to FIG. 3, a diagram is shown illustrating a recombination operation 200 in accordance with an example embodiment of the present invention. The recombination operation 200 is different from conventional arrangements to account for the new number representation format of high and low portions. The lowest cross-product, $Z_{LL}$, is generally shifted two bits to the left (e.g., $Z_{LL} \ll 2$) and the lower portion cross-products, $Z_{LH}$ and $Z_{HL}$, are generally shifted one bit to the left (e.g., $Z_{LH} \ll 1$ and $Z_{HL} \ll 1$). From a mathematical point of view, the shifting is generally performed to correctly realize the product (e.g., Z=X*Y), which may be expressed by the following Equation 4:

$$Z = Z_{HH} \times 2^{30} + Z_{HL} \times 2^{15} + Z_{LH} \times 2^{15} + Z_{LL}.\qquad\text{EQ. 4}$$

Figure 4:
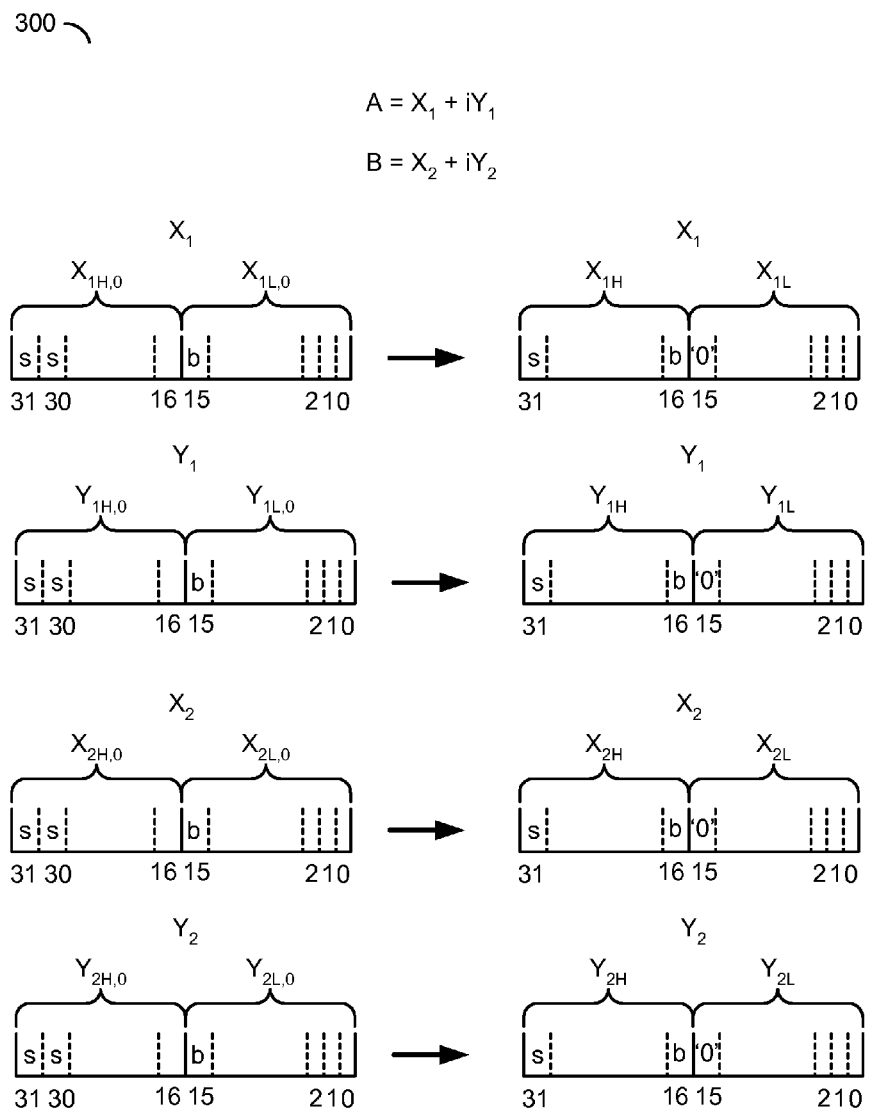
FIG. 4 is a diagram illustrating a process for converting a conventional complex number representation format into a complex number representation format in accordance with an example embodiment of the present invention.

Referring to FIG. 4, a diagram is shown illustrating a process 300 for converting a pair of complex numbers from the conventional number representation format 102 into the new number representation format 104 in accordance with an example embodiment of the present invention. Two complex numbers, $A = X_1 + iY_1$ and $B = X_2 + iY_2$, that are to be multiplied, may be divided into real (e.g., $X_1, X_2$) and imaginary (e.g., $Y_1, Y_2$) parts. Each real part $X_1$ and $X_2$ and each imaginary part $Y_1$ and $Y_2$ generally includes high and low portions (e.g., $X_{1H,0}$, $X_{2H,0}$, $Y_{1L,0}$, $Y_{2L,0}$ respectively). The real (e.g., $X_1, X_2$) and imaginary (e.g., $Y_1, Y_2$) parts may be reformatted according to the new number representation format 104. For example, in the 32-bit example, the high portions formatted in accordance with an embodiment of the present invention may be expressed by the following equations:

$$X_{1H} = (X_{1H,0} \times 2) + \text{bit 15 of } X_{1L,0},\qquad\text{EQ. 5}$$

$$Y_{1H} = (Y_{1H,0} \times 2) + \text{bit 15 of } Y_{1L,0}.\qquad\text{EQ. 6}$$

$$X_{2H} = (X_{2H,0} \times 2) + \text{bit 15 of } X_{2L,0},\qquad\text{EQ. 7}$$

$$Y_{2H} = (Y_{2H,0} \times 2) + \text{bit 15 of } Y_{2L,0}.\qquad\text{EQ. 8}$$

The respective low portions (e.g., $X_{1L}, X_{2L}, Y_{1L},$ and $Y_{2L}$) having the new format are generally made positive by replacing bit 15, which was made vacant by the shift, with zero. Because the MSB of the low portions is replaced with zero, the new representation always creates a positive low portion, which allows signed multipliers to be correctly used in the implementation. The high portions in the new representation are twice the magnitude of the high portions for the convention representation.

The process 300 generally works in a bit exact manner on up to (2N−1)-bit complex numbers, where N represents the number of bits in the basic signed complex multiplier utilized, and in an approximated manner on 2N-bit complex numbers. For example, in the conventional 32-bit representation there are generally only 30 bits of information not including the sign. In particular, the conventional 32-bit representation contains two consecutive sign ('S') bits before the reformatting operation and only one sign bit remains after the reformatting operation. Thus, the method 300 in accordance with the present invention provides a bit exact result for signed numbers of 31 bits, and an approximate result for signed numbers of 32 bits. In one example, the pair of 32-bit complex numbers A and B may be converted from the convention format 102 to the new format 104 so that the 32-bit complex numbers A and B may be multiplied using only 16-bit signed complex multipiers. Although the example is illustrated utilizing 32-bit numbers, it will be apparent to a person of ordinary skill in the art that the technique in accordance with the present invention may be implemented accordingly for numbers and multipliers implementing other bit widths.

Figure 5:
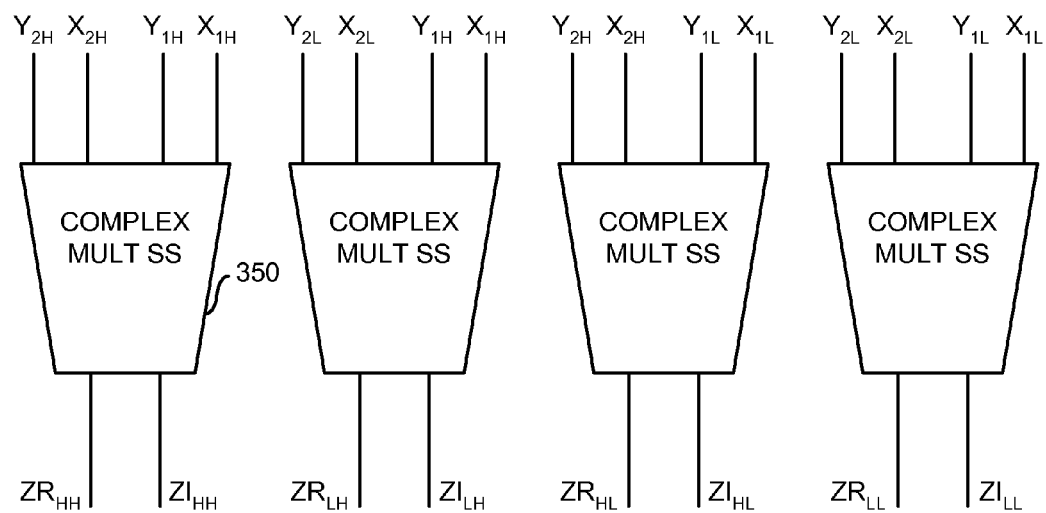
FIG. 5 is a diagram illustrating cross product generation of a complex multiplication process in accordance with an example embodiment of the present invention.

Referring to FIG. 5, a diagram is shown illustrating four multiplications performed using one or more 16-bit signed complex multipliers to generate real and imaginary cross-products that may be used to generate the product of the two 32-bit complex numbers A and B in accordance with an example embodiment of the present invention. In one example, one or more signed multipliers 350 may be used to generate four real cross-products (e.g., $ZR_{HH}$, $ZR_{LL}$, $ZR_{LH}$, $ZR_{HL}$) and four imaginary cross-products (e.g., $ZI_{HH}$, $ZI_{LL}$, $ZI_{LH}$, $ZI_{HL}$) in the multiplication of two complex numbers A and B. In one example, the one or more signed complex multipliers 350 may be implemented as 16-bit signed complex multipliers, which maybe used to multiply two 32-bit complex numbers. When the high and low portions for the two complex numbers have been constructed using the new representation format 104, the cross-products $ZR_{HH}$, $ZR_{LL}$, $ZR_{LH}$, $ZR_{HL}$, $Z_{HH}$, $ZI_{LL}$, $ZI_{LH}$, and $ZI_{HL}$ may be generated using the signed complex multiplier(s) 350. Depending on the features of the particular DSP, the cross-products may be generated sequentially or in parallel (simultaneously). Each of the sets (e.g., real and imaginary) of four cross-products maybe recombined to generate the respective product using the recombination technique 200 described above in connection with FIG. 3. From a mathematical point of view, the recombination technique 200 applied to the real and imaginary sets of cross-products produce the real and imaginary terms for the product of the complex numbers A and B (e.g., $ZR=ZR_{HH} \times 2^{30}+ZR_{HL} \times 2^{15}+ZR_{LH} \times 2^{15}+ZR_{LL}$, $ZI=ZI_{HH} \times 2^{30}+ZI_{HL} \times 2^{15}+ZI_{LH} \times 2^{15}+ZI_{LL}$, $A \times B\ Z=ZR+iZI$).

Figure 6:
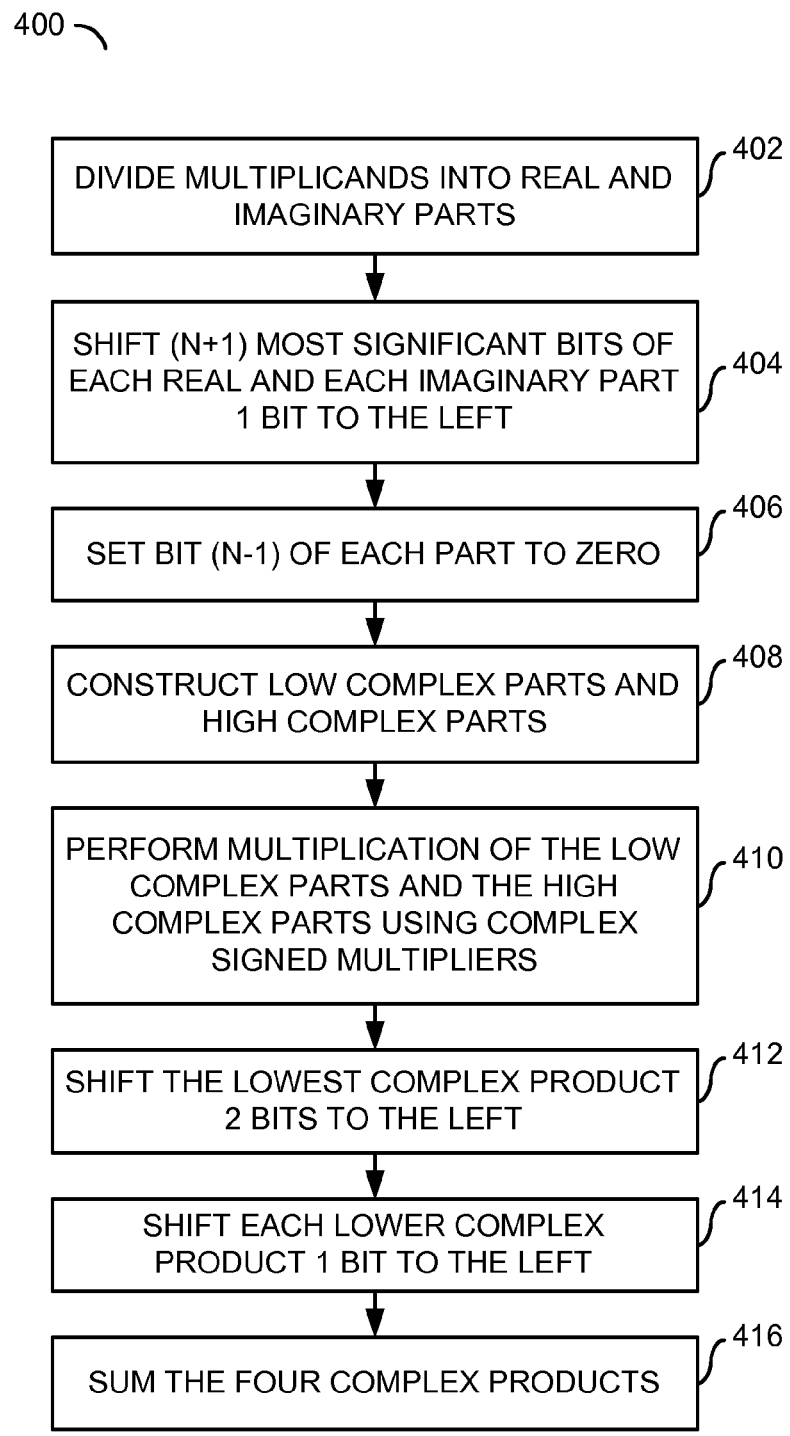
FIG. 6 is a flow diagram illustrating a process in accordance with an example embodiment of the present invention.

Referring to FIG. 6, a diagram is shown illustrating a process 400 in accordance with an example embodiment of the present invention. The process 400 generally implements 2N-bit complex multiplication with four times fewer N-bit multiplications than conventional techniques. In one example, the process 400 may be implemented to multiply 32-bit complex numbers using one or more 16-bit signed complex multipliers. Other 2N-bit multiplications with N-bit signed complex multipliers may be implemented accordingly to meet the design criteria of a particular implementation. The process 400 may be performed without dedicated hardware. The process 400 may be used also to create a simpler hardware implementation.

In one example, the process (or method) 400 may comprise a step (or state) 402, a step (or state) 404, a step (or state) 406, a step (or state) 408, a step (or state) 410, a step (or state) 412, a step (or state) 414, and a step (or state) 416. The step 402 may divide two 32-bit complex numbers into real and imaginary parts. The step 404 may shift (N+1) most significant bits (MSBs) of each of the respective real and imaginary parts one bit to the left (e.g., as illustrated by Equations 5-8 above). The step 406 may set bit (N−1) of each of the respective parts, which was vacated when the (N+1) MSBs were shifted, to zero.

In the step 408, the process 400 may construct low and high complex parts from the reformatted numbers. The step 410 may multiply the low complex parts and the high complex parts using N-bit signed complex multipliers to obtain respective cross-products. The step 412 may shift the lowest complex cross-product 2 bits to the left. The step 414 may shift each of the two lower cross-products 1 bit to the left. The step 416 may sum the four complex cross-products to generate the final complex product.

In an example embodiment of the present invention, a 32-bit complex multiplication may be implemented using complex signed 16-bit multipliers and a new number representation format. When two complex numbers are to be multiplied (e.g., $A=X_1+iY_1$ and $B=X_2+iY_2$) each of the numbers may be divided into four parts: real low, real high, imaginary low and imaginary high. The four parts of A and the four parts of B give sixteen different combinations that may be multiplied using the 16-bit multiplier(s). From a mathematical point of view:

$$A \times B=Z=\text{Real}(A) \times \text{Real}(B) - \text{Imag}(A) \times \text{Imag}(B) + i(\text{Imag}(A) \times \text{Real}(B) + \text{Real}(A) \times \text{Imag}(B)).$$

Since Real(A), Real(B), Imag(A), and Imag(B) are 32-bit real numbers, the scheme depicted in FIGS. 1-3 above may be implemented to produce each of the cross-products: Real(A)×Real(B), Imag(A)×Real(B), Real(A)×Imag(B), and Imag(A)'Imag(B).

Figure 7:
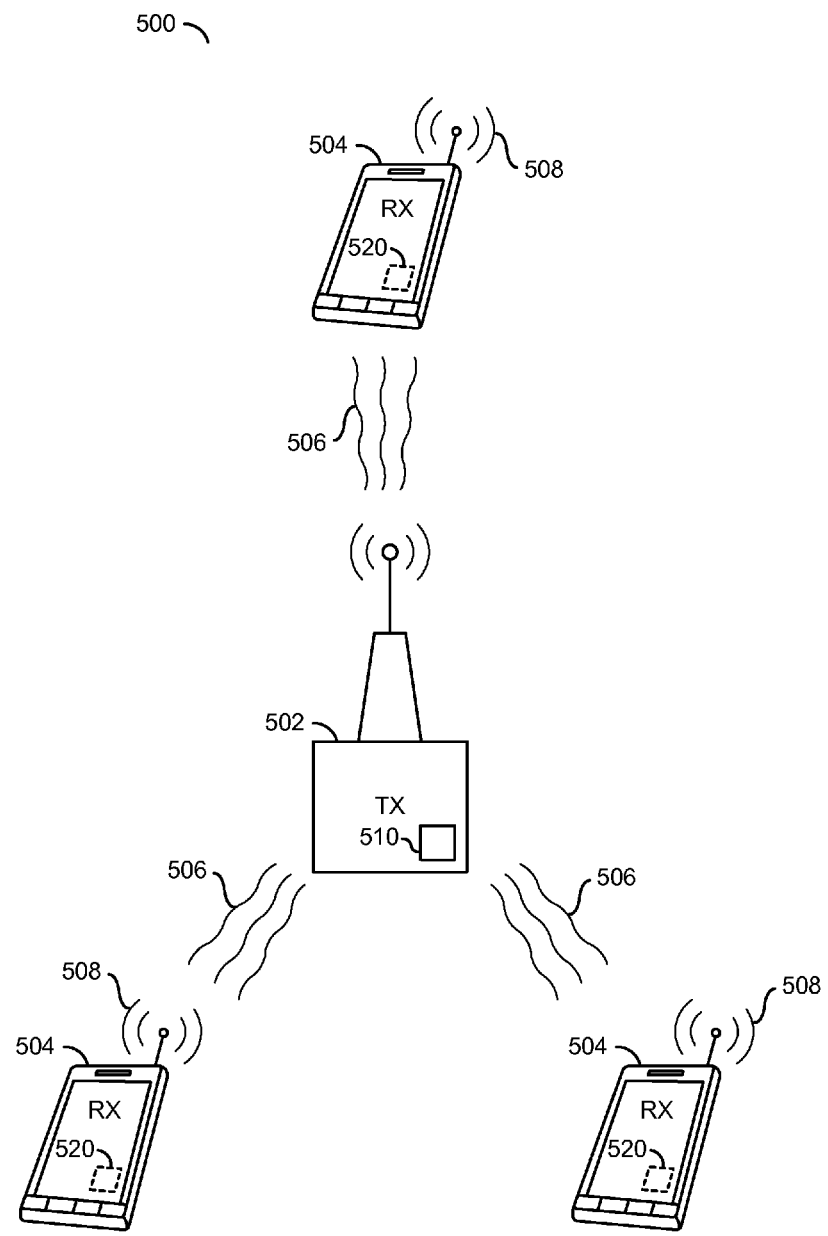
FIG. 7 is a diagram illustrating a system in which an embodiment of the present invention may be implemented.

Referring to FIG. 7, a diagram of a system 500 is shown illustrating a communications system example implemented in accordance with an example embodiment of the present invention.

The system 500 may implement a wireless communications system. In one example, the system 500 may implement a third generation cellular communication system compliant with the 3rd Generation Partnership Project (3GPP) Long Term Evolution (LTE) standard (3GPP TS 36.211 V9.1.0 (2010-03). The system 500 generally comprises at least one base station 502 and a number of mobile units 504. The base station(s) 502 may transmit signals to the mobile units 504 via a downlink channel 506. Each of the mobile units 504 may transmit signals to the base station(s) 502 via an uplink channel 508. Each base station 502 may include a processing unit 510. Each mobile unit 504 may include a processing unit 520. The processing units 510 and 520 may be configured to manage communications between the base station(s) 502 and the mobile units 504.

Figure 8:
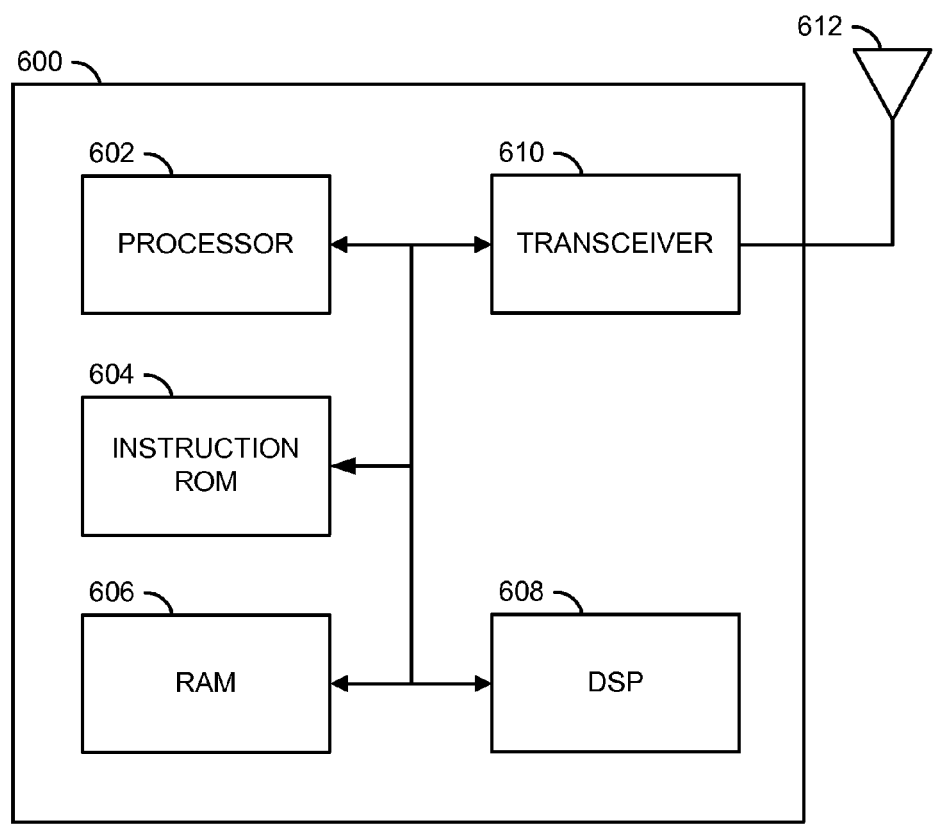
FIG. 8 is a diagram illustrating a processing unit in accordance with an example embodiment of the present invention.

Referring to FIG. 8, a block diagram is shown illustrating an example processing unit 600 that may be configured to implement complex multiplication in accordance with a preferred embodiment of the present invention. In one example, the processing units 510 and 520 of FIG. 7 may be implemented using the processing unit 600. The processing unit 600 may include, but is not limited to, a block (or module) 602, a block (or module) 604, a block (or module) 606, a block (or module) 608, a block (or module) 610, and a block (or module) 612. The block 602 may be implemented, in one example, as an embedded processor (e.g., ARM, etc.). The block 604 may be implemented as a read only memory (ROM). The block 606 may comprise random access memory (RAM). The block 608 may implement a digital signal processor (DSP). The block 510 may be implemented, in one example, as a transceiver. In another example, the block 610 may implement a transmitter and a receiver that are separate. The block 612 may implement an antenna (e.g., a cellular antenna, etc.). The block 610 may be configured to transmit and receive information via the antenna 612. The blocks 602-610 may be connected together using one or more busses. In one example, the block 604 may store computer executable instructions for controlling the processor 602 and/or the processor 208. Either or both of the processors 602 and 608 may incorporate hardware or execute software for performing complex multiplication in accordance with an embodiment of the present invention. The process in accordance with embodiments of the present invention may be performed both in parallel and in non-parallel, in software and in hardware, and in all technologies utilizing DSPs (e.g., GSM (global system for mobile communications), LTE (long term evolution), WCDMA (wideband code division multiple access), etc.).

The functions performed by the diagram of FIG. 4 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a first circuit configured to receive a first 2N-bit complex number and a second 2N-bit complex number, each having a first format in which each real and imaginary part of each 2N-bit complex number has a sign portion, comprising one or more most significant bits, and a magnitude portion, comprising all remaining bits, and to reformat the first and the second 2N-bit complex numbers to a second format such that each real and imaginary part of each reformatted 2N-bit complex number comprises a signed upper portion and a signed lower portion and the signed lower portion of each real and imaginary part of each reformatted 2N-bit complex number is positive; and
a second circuit configured to multiply the reformatted first and the reformatted second 2N-bit complex numbers using at least one N-bit signed complex multiplier, wherein N is an integer.

2. The apparatus according to claim 1, wherein said first circuit is further configured to reformat the first and the second 2N-bit complex numbers such that (N+1) most significant bits of the real part of each 2N-bit complex number are shifted one bit to the left, (N+1) most significant bits of the imaginary part of each 2N-bit complex number are shifted one bit to the left, and each (N−1) bit of the real part and the imaginary part of each 2N-bit complex number is set to zero.

3. The apparatus according to claim 1, wherein said second circuit comprises four N-bit signed complex multipliers configured to operate in parallel.

4. The apparatus according to claim 1, wherein said at least one N-bit signed complex multiplier comprises a 16-bit signed complex multiplier.

5. The apparatus according to claim 1, wherein said apparatus is part of a digital signal processing unit.

6. The apparatus according to claim 1, wherein said apparatus is part of a device in an evolved universal terrestrial radio access (E-UTRA) system.

7. The apparatus according to claim 6, wherein said E-UTRA system is Long Term Evolution compliant.

8. The apparatus according to claim 1, wherein said apparatus is part of a global system for mobile communications (GSM) device.

9. The apparatus according to claim 1, wherein said second circuit is further configured to shift and sum respective outputs of said at least one N-bit signed complex multiplier to generate a 4N-bit real portion and a 4N-bit imaginary portion representing the product of said first and said second 2N-bit complex numbers.

10. The apparatus according to claim 9, wherein said second circuit is configured to shift an output of said at least one N-bit signed complex multiplier representing a lowest cross-product two bits to the left, an output of said at least one N-bit signed complex multiplier representing a first lower cross-product one bit to the left, an output of said at least one N-bit signed complex multiplier representing a second lower cross-product one bit to the left, and sum the shifted cross-products with an output of said at least one N-bit signed complex multiplier representing a highest cross-product.

11. A method of multiplying 2N-bit complex numbers using one or more N-bit signed complex multipliers comprising the steps of:
receiving a first and a second 2N-bit complex number having a first format in which each real and imaginary part of each 2N-bit complex number has a sign portion, comprising one or more most significant bits, and a magnitude portion, comprising all remaining bits;
reformatting the first and the second 2N-bit complex numbers to a second format such that each real and imaginary part of each reformatted 2N-bit complex number comprises a signed upper portion and a signed lower portion and the signed lower portion of each real and imaginary part of each reformatted 2N-bit complex number is positive; and multiplying the reformatted first and the reformatted second complex numbers using only one or more N-bit signed complex multipliers, wherein N is an integer and the one or more N-bit signed complex multipliers are implemented in hardware or a combination of hardware and software.

12. The method according to claim 11, wherein reformatting the first and the second 2N-bit complex numbers to a second format further comprises:

shifting (N+1) most significant bits of a real portion of each 2N-bit complex number one bit to the left;

shifting (N+1) most significant bits of an imaginary portion of each 2N-bit complex number one bit to the left; and setting each (N−1) bit of the real portion and the imaginary portion of each 2N-bit complex number to zero.

13. The method according to claim 11, further comprising:

dividing two 32-bit complex numbers into real and imaginary parts;

shifting 17 most significant bits of the real and imaginary parts of each 32-bit complex number one bit to the left;

setting a bit the real and imaginary parts of each 32-bit complex number vacated when the respective 17 most significant bits were shifted to zero;

constructing low and high complex parts from the reformatted numbers;

multiplying the low complex parts and the high complex parts using 16-bit signed complex multipliers to obtain a highest complex cross-product, a first lower complex cross-product, a second lower complex cross-product, and a lowest complex cross-product;

shifting the lowest complex cross-product two bits to the left;

shifting each of said first and said second lower complex cross-products one bit to the left; and summing the four complex cross-products.

14. The method according to claim 13, wherein said four complex cross products are generated sequentially.

15. The method according to claim 13, wherein said four complex cross products are generated in parallel.

16. The method according to claim 11, wherein said steps are performed by a digital signal processor in response to executing computer executable instructions stored in a memory.

17. The method according to claim 16, wherein said digital signal processor and memory are part of a device in an evolved universal terrestrial radio access (E-UTRA) system.

18. The method according to claim 17, wherein said E-UTRA system is Long Term Evolution compliant.

19. The method according to claim 16, wherein said digital signal processor and memory are part of a global system for mobile communications (GSM) device.

20. An apparatus comprising:

means for receiving a first 2N-bit complex number and a second 2N-bit complex number, each having a first format in which each real and imaginary part of each 2N-bit complex number has a sign portion, comprising one or more most significant bits, and a magnitude portion, comprising all remaining bits, and reformatting the first and the second 2N-bit complex numbers to a second format such that (N+1) most significant bits of a real portion of each 2N-bit complex number are shifted one bit to the left, (N+1) most significant bits of an imaginary portion of each 2N-bit complex number are shifted one bit to the left, and each (N−1) bit of said real portion and said imaginary portion of each 2N-bit complex number is set to zero; and means for multiplying the reformatted first and the reformatted second 2N-bit complex numbers using at least one N-bit signed complex multiplier, wherein N is an integer.

* * * * *